E. Z. LEWIS.
MANIFOLDING BOOK.
APPLICATION FILED OCT. 25, 1912.
1,156,411.
Patented Oct. 12, 1915.
2 SHEETS—SHEET 1.
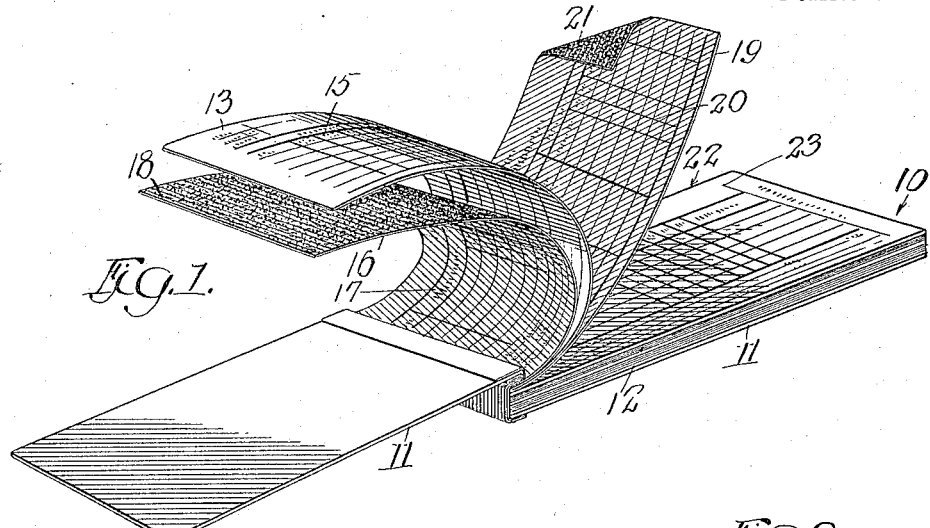
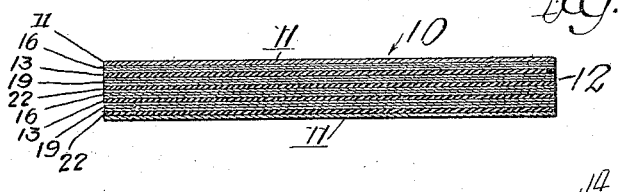
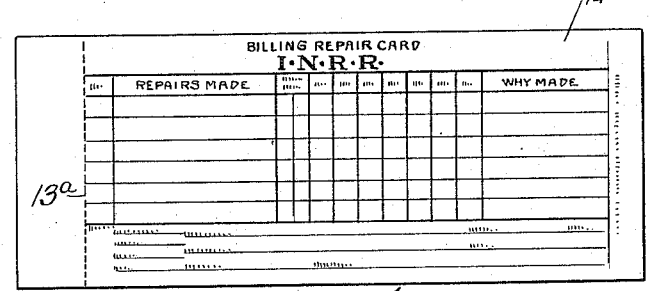
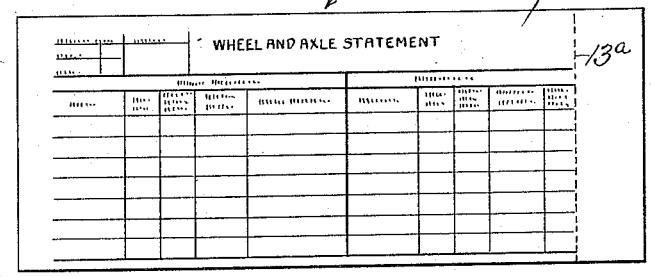
Witnesses:
Inventor
Edward Z. Lewis
by [Attorneys]
COLUMBIA PLANOGRAPH CO., WASHINGTON, D. C.

E. Z. LEWIS.
MANIFOLDING BOOK.
APPLICATION FILED OCT. 25, 1912.

1,156,411.

Patented Oct. 12, 1915.
2 SHEETS—SHEET 2.

Witnesses:

Inventor
Edward Z. Lewis

UNITED STATES PATENT OFFICE.

EDWARD ZUVER LEWIS, OF CHICAGO, ILLINOIS, ASSIGNOR TO THE GENERAL MANIFOLD AND PRINTING COMPANY, OF FRANKLIN, PENNSYLVANIA, A CORPORATION OF PENNSYLVANIA.

MANIFOLDING-BOOK.

1,156,411.  Specification of Letters Patent.  Patented Oct. 12, 1915.

Application filed October 25, 1912. Serial No. 727,656.

*To all whom it may concern:*

Be it known that I, EDWARD ZUVER LEWIS, a citizen of the United States, and a resident of Chicago, in the county of Cook and State of Illinois, have invented certain new and useful Improvements in Manifolding-Books; and I do hereby declare that the following is a full, clear, and exact description thereof, reference being had to the accompanying drawings, and to the letters of reference marked thereon, which form a part of this specification.

This invention relates to a manifolding book or pad and consists of the matters hereinafter described and more particularly pointed out in the appended claims.

The invention as shown herein is particularly adapted for use by railroads and is specifically illustrated as applied to a book or pad for billing accounts of car repairs and the like and for making records of the same.

It comprises a manifolding book containing a plurality of sheets arranged in sets of four, each constructed in such manner that five writings may be produced by two writing operations, without danger of transferring any of the writing on one set of four to the sheet or sheets of the next subjacent set of fours.

It will be understood of course that the particular forms of bills and records shown in the drawings simply represent one example of the use to which my invention may be put and that my improved manifolding book may be used for other matters where the requirements are the same.

In the repairing of railroad cars there are the repairs to the car body itself which are referred to generally as "repairs" and are noted on a repair card attached to the car and on a repair card bill which is sent to the road owning the car repaired, and there are repairs or renewals of the car wheels and axles which are noted on a second billing sheet called a wheel and axle statement that is likewise sent to the railroad owning the car. Copies of both the repair card and of the wheel and axle statement are also required to be made as a record for the railroad that makes the repairs.

The advantages of my invention lie essentially in the saving of time due to its use and in the simplicity of its manipulation, there being produced the five different copies above described by two writings.

In the drawings:—Figure 1 is a view representing a perspective of my improved manifolding book showing the cover laid back and some of the leaves folded partway back to show the arrangement of the book. Fig. 2 is a view representing a transverse section through the book. Figs. 3 and 4 are plan views showing respectively the face and back of a billing sheet, on the face of which (Fig. 3) is printed a repair card bill-form and on the back of which is printed a wheel and axle statement-form. Fig. 5 is a view showing in plan a sheet on which is printed a repair card record-form. Fig. 6 is a view showing in plan a sheet on which is printed a duplicate of the wheel and axle statement-form and is adapted to receive a copy of the matter written thereon. Fig. 7 shows the front face of the repair card which is printed with a form identical with the repair card record-form.

Referring now to that embodiment of my invention illustrated in the drawings, 10 indicates the book as a whole having suitable backs or covers 11, 11, made of heavy card-board and bound together at one end so as to open lengthwise. 12 indicates generally a plurality of sheets and cards bound between said card-board backs and arranged in a manner now to be described in sets of four to each set.

13 indicates a billing sheet having printed on its face (Fig. 3) a form 14 that is a duplicate of that appearing on the repair card, and on its back (Fig. 4) a wheel and axle statement form 15. This is the sheet that is sent, in the case illustrated, to the railroad company owning the car on which the repairs are made, the face being adapted to receive the list of repairs made and remarks or other information relating thereto and the back being designed to receive a like notation with regard to the wheels and axles of the car.

16 (Fig. 5) indicates a sheet which also has printed on its face a form that is a duplicate of that appearing on the repair card and which constitutes a record of the repair card to be retained by the railroad company making the repairs. Said sheet is provided on its back with a coating of transfer material 18 (see Fig. 1).

19 indicates a sheet on the face of which is printed a duplicate 20 of the form printed on the wheel and axle statement and which constitutes a copy or record of the wheel and axle statement to be retained by the railroad company making the repairs. Said sheet is provided on its back with a coating of transfer material 21 (see Fig. 1).

22 indicates a repair card (Fig. 7) made of heavy paper or card-board, on one face of which is printed a form 23, adapted for noting the car repairs and remarks relating thereto. This form, as above stated, is identical with the form 14 on the billing sheet 13 and with the form 17 on the repair card record sheet 16.

The several sheets referred to are bound in the book in the following order:—First, the repair card record sheet 16 with its printed form 17 on top and with its back, having the transfer material 18, below; second, the billing sheet 13 with its face bearing the form 14 on top and with its back, bearing the wheel and axle statement-form 15, below; next, the sheet 19 with its face bearing the wheel and axle record-form 20 on top and its back, provided with the transfer material 21, below; and lastly, the repair card 22. Each of the several sheets mentioned, except the repair card record sheet 16 is provided near the end that is bound in the book, with lines of perforations or other lines of weakening, so that it may be readily detached from the book,—19ª indicating the line of perforations for the sheet 19; 22ª that for the card, and 13ª that for the billing sheet. A plurality of sets of four arranged in the order described are bound in the book 10.

My improved manifolding book is used as follows: The top sheet of each set being the repair card record sheet 16, a list of the repairs made on the car and other remarks relating thereto are written thereon. As the billing sheet 13 lies next below this repair card record sheet with its face bearing the form 14 in immediate contact with the transfer material on the back of said repair card record sheet, the matter thus written is reproduced upon the face of said billing sheet. In addition, by reason of the transfer material 21 on the back of the sheet 19, the matter written on the repair card record sheet is also reproduced on the repair card itself. The latter being a heavy piece of card-board prevents further transfer of the matter written to the other sheets in the book. We have thus produced in the one writing the bill to be sent to the owner of the car, the card to be attached to the car itself and the record to be retained by the railroad making the repairs. The billing sheet 13 is then torn out and if there are any wheel repairs, said sheet is reversed end for end so as to bring its back bearing the wheel and axle statement form 15 on top and it is inserted beneath the sheet 19 in contact with the transfer material 21 on the back thereof. The statement with reference to the wheels and axles is then written on the face of the sheet 19 and as written is reproduced by the said transfer material on the wheel and axle statement form on the billing sheet 13, the card again preventing the transfer of the matter thus written to succeeding sets of forms in the book. This billing sheet 13 is then sent to the railroad owning the car which then has in its possession both the record of the repairs and also the wheel and axle statement. Duplicate records of both of these are retained in the book while the repair card itself is torn from the book and placed upon the car. This finishes the matter.

The convenience and the rapidity with which the five writings described and required may be made are apparent as well as the resultant time saved and therefore money paid in wages due to its use. In case there are no renewals or repairs to the wheels or axles of the car, a statement in this connection is not required and the record or copy sheet 19 intended to have this statement written upon it is torn from the book and the wheel and axle statement form 15 on the back of sheet 13 is left blank.

The faces of the sheets that are intended to be left in the book as records, namely, the repair card record sheet 16 and the wheel and axle statement record sheet 19 are preferably colored or printed in different tones or with different colors as indicated in order that they may be readily picked out and distinguished one from the other when one is looking through the book to find or examine old records. For the same reason the transfer materials on the backs of said sheets are likewise colored differently so as to make the distinction between the two record sheets as definite and easily noticed as possible.

I claim as my invention:—

1. A manifolding book comprising a plurality of sets of sheets bound in book or pad form, each set comprising four sheets; the first three sheets of the set being of comparatively light material and the fourth sheet of the set being of heavier material; the first, second and fourth sheets of each set being provided with corresponding indicia on their front faces; the first and third sheets of each set being provided on their back faces with transfer material; the third sheet being provided on its face with indicia different from that of the first, second and fourth sheets; and the second sheet being provided on its back with indicia similar to that on the face of the third sheet, but said indicia being in reversed order.

2. A manifolding book comprising a plurality of sets of sheets bound in book or pad form, each set comprising four sheets; the first three sheets of the set being of comparatively light material and the fourth sheet of the set being of heavier material; the first, second and fourth sheets of each set being provided with corresponding indicia on their front faces; the first and third sheets of each set being provided on their back faces with transfer material; the third sheet being provided on its face with indicia different from that of the first, second and fourth sheets; the second sheet being provided on its back with indicia similar to that on the face of the third sheet, but said indicia being in reversed order; and all of said sheets except the first being provided near their bound ends with lines of weakening by means of which they may be detached from the book or pad.

In testimony, that I, claim the foregoing as my invention I affix my signature in the presence of two witnesses, this 22nd day of October A. D. 1912.

EDWARD ZUVER LEWIS.

Witnesses:
GEORGE R. WILKINS,
KARL R. STOREY.

Copies of this patent may be obtained for five cents each, by addressing the "Commissioner of Patents, Washington, D. C."